US012677147B2

(12) United States Patent
Krishnappa et al.

(10) Patent No.: US 12,677,147 B2
(45) Date of Patent: Jul. 7, 2026

(54) DYNAMIC RESERVE WLAN BASED ON AUTHENTICATION AVAILABILITY

(71) Applicant: Ruckus IP Holdings LLC, Claremont, NC (US)

(72) Inventors: Raghavendra Bethamangala Krishnappa, Bangalore (IN); Siva Lingaprasad Sola, Bangalore (IN); Liangyi Huang, Taoyuan City (TW); Sharath Singpatna Manjegowda, Bangalore (IN); Gaanavi Gowda H. B., Mandya (IN)

(73) Assignee: Ruckus IP Holdings LLC, Horsham, PA (US)

( * ) Notice: Subject to any disclaimer, the term of this patent is extended or adjusted under 35 U.S.C. 154(b) by 239 days.

(21) Appl. No.: 18/425,589

(22) Filed: Jan. 29, 2024

(65) Prior Publication Data

US 2024/0259800 A1　　Aug. 1, 2024

Related U.S. Application Data

(60) Provisional application No. 63/482,408, filed on Jan. 31, 2023.

(51) Int. Cl.
　*H04W 12/06*　　　(2021.01)
　*H04W 84/12*　　　(2009.01)
(52) U.S. Cl.
　CPC ............ *H04W 12/06* (2013.01); *H04W 84/12* (2013.01)

(58) Field of Classification Search
　CPC .............................. H04W 12/06; H04W 84/12
　See application file for complete search history.

(56) References Cited

U.S. PATENT DOCUMENTS

| | | | | |
|---|---|---|---|---|
| 9,438,604 | B1 * | 9/2016 | Addala | ............... H04L 63/0853 |
| 10,360,366 | B1 * | 7/2019 | Dubey | ............... H04L 41/0663 |
| 2017/0223536 | A1 * | 8/2017 | Gupta | ..................... G06F 21/31 |
| 2018/0167389 | A1 * | 6/2018 | Zou | ........................ H04W 12/08 |
| 2018/0351809 | A1 * | 12/2018 | Meredith | ............ H04L 43/0882 |

* cited by examiner

*Primary Examiner* — Kostas J Katsikis

(74) *Attorney, Agent, or Firm* — Myers Bigel, P.A.

(57) ABSTRACT

An electronic device (such as an access point) that dynamically provides a reserve wireless local area network (WLAN) having a reserve service set identifier (SSID) is described. During operation, the electronic device may provide a WLAN having an SSID, where access to services in a network via the WLAN is gated by authentication performed by a computer. Note that the computer may include a controller of the electronic device or an authentication computer. When the computer is offline or communication with the computer is unavailable, the electronic device may dynamically provide the reserve WLAN having the reserve SSID, where access to a subset of the services in the network via the reserve WLAN is gated by second authentication performed by the electronic device. Moreover, the services may include sensitive (or more-secure) and insensitive (or less-secure) services, and the subset of the services may include the insensitive services.

20 Claims, 4 Drawing Sheets

DYNAMIC RESERVE WLAN BASED ON AUTHENTICATION AVAILABILITY

CROSS REFERENCE TO RELATED APPLICATIONS

This application claims priority under 35 U.S.C. 119(e) to U.S. Provisional Application Ser. No. 63/482,408, "Dynamic Reserve WLAN Based on Authentication Availability," filed on Jan. 31, 2023, by Raghavendra Bethamangala Krishnappa et al., the contents of which are herein incorporated by reference.

FIELD

The described embodiments relate to techniques for dynamically providing a reserve wireless local area network (WLAN) having a reserve service set identifier (SSID) for less-restrictive access to insensitive services in a network based at least in part on the unavailability of strong authentication.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via WLANs using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

One challenge is managing a network is how to authenticate users to confirm their identity and to authorize their access to the network. In enterprise wireless networks (such as an enterprise wireless local area network or WLAN), strong authentication (such as IEEE 802.1x authentication) is widely used when a user accesses a WLAN. Moreover, in a large-scale WLAN deployment, IEEE 802.1x authentication message are typically forwarded to a remote authentication server (such as an authentication dial-in user service or RADIUS server) for processing.

However, the architecture can result in a variety of problems. For example, the RADIUS server may become overload, which result in IEEE 802.1x authentication failure or delayed authentication. Alternatively or additionally, when the RADIUS server is unavailable for an extended period of time, then clients may be unable to join the WLAN until the RADIUS server is back in service or available. These delays or barriers to network access are frustrating to users and network administrators.

SUMMARY

An electronic device that dynamically provides a reserve WLAN having a reserve SSID is described. This electronic device may include: one or more interface circuits that communicate with a computer; a processor; and a memory that stores program instructions, where, when executed by the processor, the program instructions cause the electronic device to perform operations. Notably, during operation, the electronic device provides a WLAN having an SSID, where access to services in a network via the WLAN is gated by authentication (such as primary authentication) performed by the computer. When the computer is offline or communication with the computer is unavailable, the electronic device dynamically provides the reserve WLAN having the reserve SSID, where access to a subset of the services in the network via the reserve WLAN is gated by second authentication performed by the electronic device.

Note that the electronic device may include an access point.

Moreover, the computer may include a controller of the electronic device or an authentication computer. For example, the authentication computer may include a RADIUS server or an authentication, authorization, and accounting (AAA) server.

Furthermore, the services may include sensitive (or more-secure) and insensitive (or less-secure) services, and the subset of the services may include the insensitive services.

Additionally, the second authentication may be less secure than the authentication. For example, the second authentication may include pre-shared-key (PSK) authentication.

In some embodiments, when the computer is online or communication with the computer is available, the electronic device dynamically turns off the reserve WLAN having the reserve SSID. Alternatively or additionally, when no electronic devices are connected to the reserve WLAN having the reserve SSID (such as because the connections time out or user-initiated disconnection), the electronic device dynamically turns off the reserve WLAN having the reserve SSID.

Note that when the computer is online and when the electronic devices are still associated with the reserve WLAN, one or more additional electronic devices joining the network at this time may not be allowed to use the reserve WLAN. Instead, the one or more additional electronic devices may only be allowed to join via the WLAN.

Another embodiment provides the second electronic device that performs counterpart operations to at least some of the aforementioned operations of the electronic device.

Another embodiment provides the computer that performs counterpart operations to at least some of the aforementioned operations of the electronic device.

Another embodiment provides a system that includes the electronic device and/or the computer.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
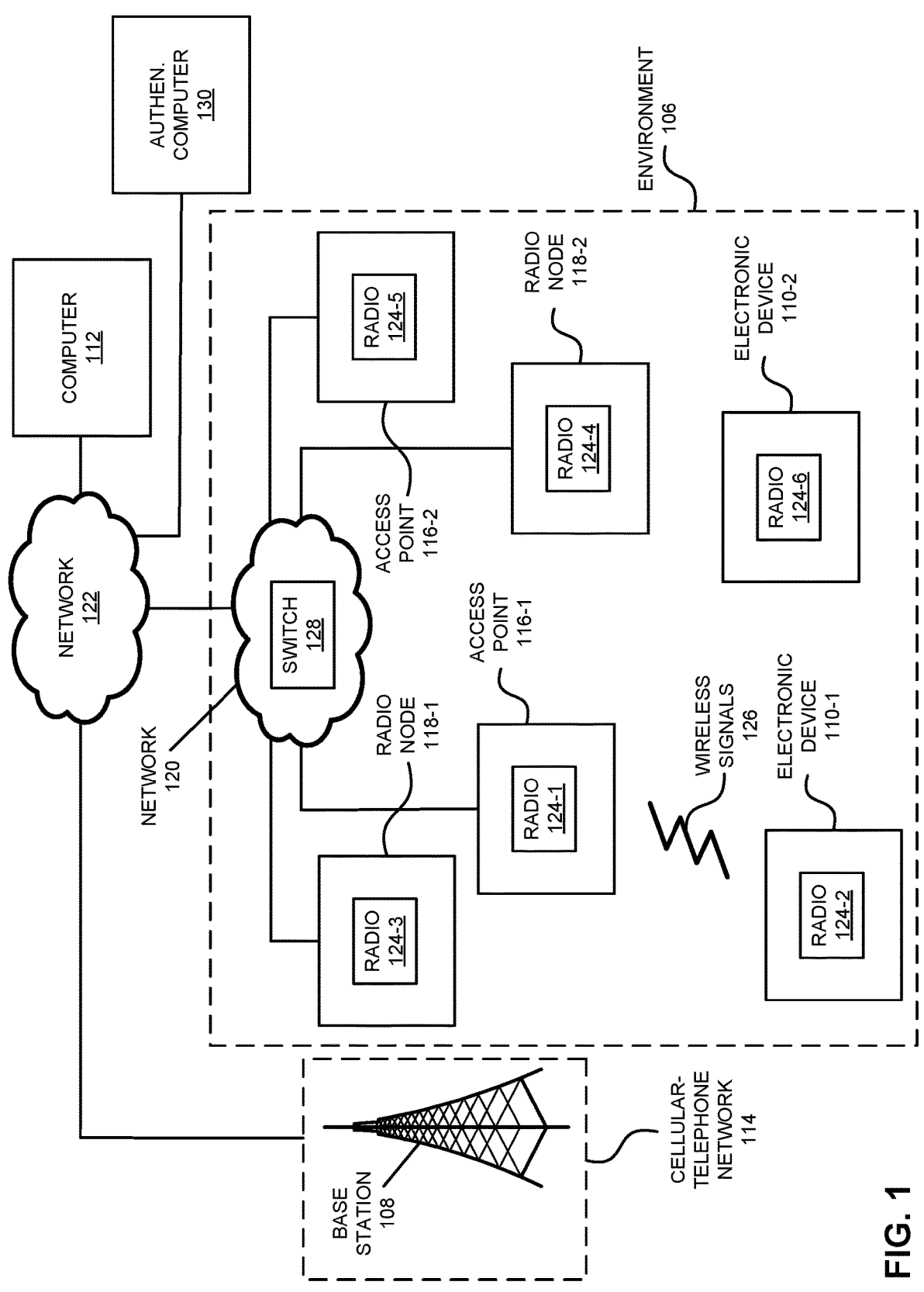
FIG. 1 is a block diagram illustrating an example of communication among electronic devices in accordance with an embodiment of the present disclosure.

An electronic device (such as an access point) that dynamically provides a reserve WLAN having a reserve SSID is described. During operation, the electronic device may provide a WLAN having an SSID, where access to services in a network via the WLAN is gated by authentication (such as primary authentication) performed by a computer. Note that the computer may include a controller of the electronic device or an authentication computer. When the computer is offline or communication with the computer is unavailable, the electronic device may dynamically provide the reserve WLAN having the reserve SSID, where access to a subset of the services in the network via the reserve WLAN is gated by second authentication performed by the electronic device. Moreover, the services may include sensitive (or more-secure) and insensitive (or less-secure) services, and the subset of the services may include the insensitive services. Furthermore, the second authentication may be less secure than the authentication.

By dynamically providing the reserve WLAN having the reserve SSID, these communication techniques may facilitate access to the insensitive services even when the computer is unavailable or communication with the computer is unavailable. Thus, the communication techniques may allow limited use of the network to continue when the computer is unavailable or communication with the computer is unavailable. In the process, the communication techniques may eliminate delays in accessing the insensitive services. Consequently, the communication techniques may reduce frustration of the users and network operators or network administrators, and may improve the user experience when using in the network.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, as noted previously, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer 112 (which may be a cloud-based controller that manages and/or configures access points 116, radio nodes 118 and/or switch 128, or that provides cloud-based storage and/or analytical services) and/or authentication computer 130 (such as a RADIUS server and/or an AAA server) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 4:
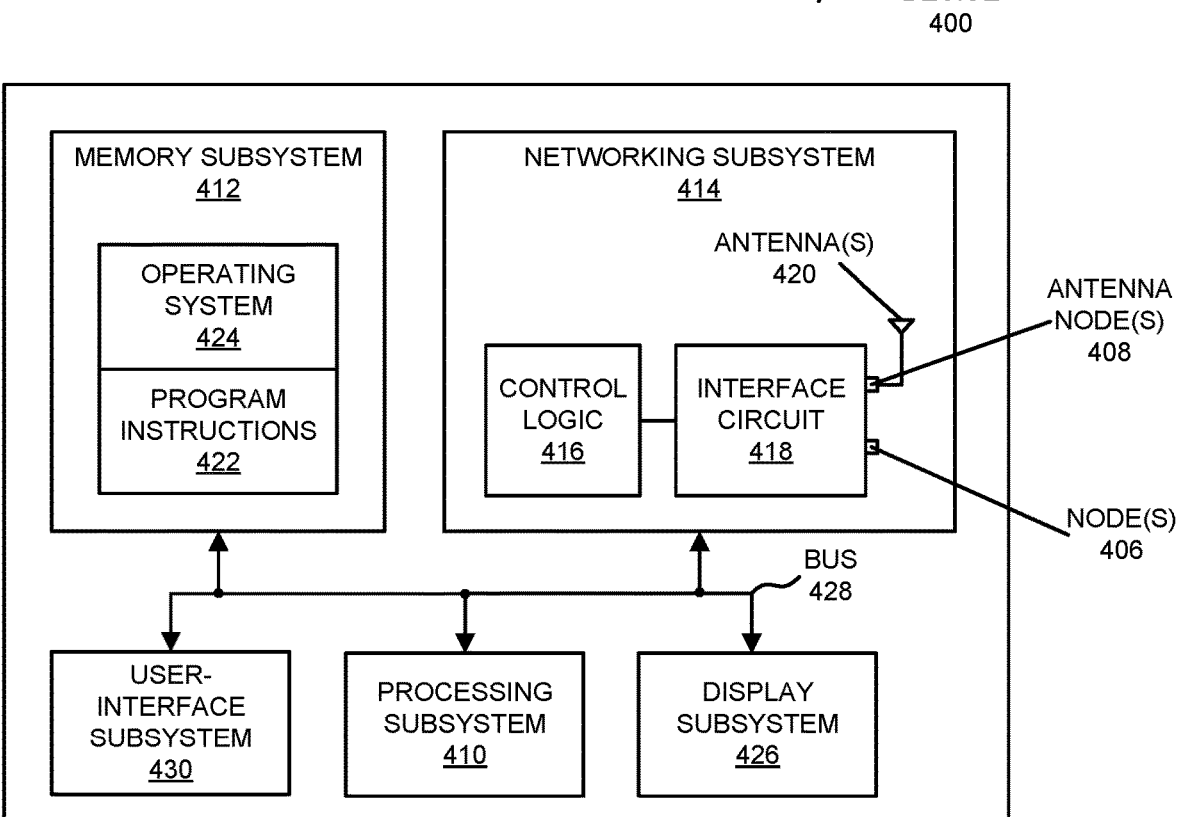
FIG. 4 is a block diagram illustrating an example of an electronic device in accordance with an embodiment of the present disclosure.

As described further below with reference to FIG. 4, electronic devices 110, computer 112, access points 116, radio nodes 118, switch 128 and authentication computer 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 7 GHz, 60

GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) or multiple-input and multiple-output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

An electronic device (such as access point 116-1 or radio node 118-1 and more generally a computer network device) may perform the disclosed communication techniques. In the discussion that follows, access point 116-1 is used to illustrate the communication techniques.

During operation, access point 116-1 may provide a WLAN having an SSID. After discovering and associating with or establishing a connection with this WLAN provided by access point 116-1, a second electronic device (such as electronic device 110-1) may be authenticated, via access point 116-1, by a computer, such as computer 112 or authentication computer 130. In the discussion that follows, authentication computer 130 is used as an example of the computer. Moreover, after electronic device 110-1 is successfully authenticated by authentication computer 130, electronic device 110-1 may be able to access, via the WLAN, services in networks 120 and/or 122 that includes access point 116-1 (thus, access to the services may be gated by the authentication performed by authentication computer 130). These services may include sensitive (or more-secure) and insensitive (or less-secure) services. Note that the sensitive services may require strong authentication before they can be accessed.

However, when authentication computer 130 is offline (or unavailable) or communication with authentication computer 130 is unavailable, electronic device 110-1 may not be able to be authenticated by authentication computer 130 and, thus, may not be able to obtain secure access to networks 120 and/or 122. As described further below with reference to FIGS. 2 and 3, in order to address this problem access point 116-1 may perform the disclosed communication techniques. Notably, when authentication computer 130 is offline or communication with authentication computer 130 is unavailable (e.g., as determined by an absence of a received heartbeat message from authentication computer 130 during a time interval, e.g., 30 s), access point 116-1 may dynamically provide a reserve WLAN having a reserve SSID. Then, after a second electronic device (such as electronic device 110-1, which may not be currently associated with access point 116-1) may discover and associate with or established a connection with the reserve WLAN provided by access point 116-1, electronic device 110-1 may be authenticated by access point 116-1. For example, the authentication performed by access point 116-1 may include PSK authentication (however, other authentication techniques may be used). Note that the authentication performed by access point 116-1 may be less secure than the authentication performed by authentication computer 130.

Moreover, after electronic device 110-1 is successfully authenticated by access point 116-1, electronic device 110-1 may be able to access, via the reserve WLAN, a subset of the services in network 120 and/or 122 that includes access point 116-1 (thus, access to the subset of the services may be gated by the authentication performed by access point 116-1). The subset of the services may include the insensitive services (and, thus, may exclude the sensitive services).

Furthermore, when authentication computer 130 is online or communication with authentication computer 130 is available again (and when there are no existing associations or connections with the reserve WLAN), access point 116-1 may dynamically turn off the reserve WLAN having the reserve SSID. Alternatively or additionally, when no electronic devices are connected to the reserve WLAN having the reserve SSID for a second (e.g., idle or session timeout) time interval (such as because the connections time out or user-initiated disconnection), access point 116-1 may dynamically turn off the reserve WLAN having the reserve SSID. For example, turning off the reserve WLAN may include: disabling beacons with the reserve SSID; disabling responses to probe requests for the reserve SSID; and/or disabling responses to association requests for the reserve SSID. In some embodiments, enabling or disabling (turning off) the reserve WLAN may occur in a media access control (MAC) layer.

In these ways, the communication techniques may allow access point 116-1 to selectively perform authentication. Notably, the communication techniques may allow access point 116-1 to dynamically provide the reserve WLAN and to selectively authenticate and provide access by electronic device 110-1 to the subset of the services in networks 120 and/or 122. This capability may allow dynamic access to subset of the services in networks 120 and/or 122 (such as access at one or more locations and/or at different times), even when authentication computer 130 is unavailable. Consequently, the communication techniques may improve the user experience when using electronic device 110-1, access point 116-1 and communicating via networks 120 and/or 122.

We now discuss embodiments in which PSK authentication is performed by access point 116-1 during the four-way handshake with electronic device 110-1. Notably, an electronic device 110-1 may discover and associate with or establish a connection with access point 116-1 (and, via the WLAN provided by access point 116-1, with networks 120 and 122). For example, electronic device 110-1 may provide an authentication request to access point 116-1. Then, access point 116-1 may provide a user-equipment context request to computer 112. Computer 112 may subsequently provide a user-equipment context response to access point 116-1, which may confirm that there is not an existing context or association for electronic device 110-1 in the WLAN.

Moreover, access point 116-1 may provide an authentication response to electronic device 110-1. Next, electronic device 110-1 may provide an association request to access point 116-1, which may respond by providing an association response to electronic device 110-1. Note that, at this point there is a connection between electronic device 110-1 and access point 116-1, but the communication is not encrypted. Furthermore, computer 112 may provide the user-equipment context response to access point 116-1, such as a negative acknowledgment or NACK.

After associating with electronic device 110-1, access point 116-1 may provide an identity request to electronic device 110-1. Then, electronic device 110-1 may provide an identity response to access point 116-1. Next, electronic device 110-1 may perform, via the WLAN, authentication with authentication computer 130. After successful authentication, authentication computer 130 may provide authentication information to access point 116-1, which allows access point 116-1 to establish secure communication with electronic device 110-1.

However, in order to address circumstances in which authentication computer 130 is offline or communication with authentication computer 130 is unavailable, access point 116-1 may dynamically provide the reserve WLAN. When electronic device 110-1 is not currently connected to WLAN, electronic device 110-1 may discover and associated with or establish a connection, via the reserve WLAN, with access point 116-1. Moreover, access point 116-1 may have been configured to perform authentication of electronic device 110-1 to network 120 and/or network 122. Notably, electronic device 110-1 may have previously been authenticated by authentication computer 130 and then electronic device 110-1 may have disconnected from access point 116-1. After authentication computer 130 authenticated electronic device 110-1, access point 116-1 may have: received, from authentication computer 130, a predefined hash function and associated authentication parameters, where the predefined hash function and the authentication parameters are associated with electronic device 110-1; and stored, in memory in or associated with access point 116-1, the predefined hash function and the authentication parameters.

Therefore, after receiving the identity response and when authentication computer 130 is offline or communication with authentication computer 130 is unavailable, access point 116-1 may access, in the memory in or associated with access point 116-1, the predefined hash function and the authentication parameters for an authentication technique (such as a type of extensible authentication protocol or EAP). Note that the type of EAP may include: Protected EAP (PEAP), a password-based and one-way authentication protocol (such as EAP-MD5), EAP-Transport Layer Security (EAP-TLS), EAP-Tunnel TLS (EAP-TTLS), EAP-Encrypted Key Exchange (EKE), Lightweight EAP (LEAP), etc. For PEAP, generating the encryption key (operation 220) may involve: performing a hash (e.g., using the predefined hash function) of a password of a user, and then using the hash result to generate the encryption key. In some embodiments, the authentication may include a MAC-level authentication implemented, at least in part, using software.

Next, access point 116-1 may perform authentication with electronic device 110-1 based at least in part on the predefined hash function, where the authentication is compatible with the authentication technique. Moreover, access point 116-1 may generate an encryption key (such as a pairwise master key or PMK), and may establish secure communication with electronic device 110-1 by performing a four-way handshake with electronic device 110-1 based at least in part on the encryption key. For example, the four-way handshake may include or may be compatible with EAP over a local area network or LAN (EAPol). As discussed further below, note that in some authentication techniques the authentication is performed by access point 116-1 during the four-way handshake with electronic device 110-1.

In some embodiments, the authentication parameters may specify a time interval for the predefined hash function. Consequently, after the time interval has elapsed, access point 116-1 may delete the predefined hash function, e.g., in the memory. Alternatively, when authentication computer 130 is available, access point 116-1 may provide, to authentication computer 130, a renewal request prior to the time interval elapsing. In response, access point 116-1 may receive, from authentication computer 130, a second predefined hash function and second authentication parameters.

Then, access point 116-1 may store, in the memory, the second predefined hash function and the second authentication parameters.

In these ways, the communication techniques may allow access point 116-1 to dynamically provide the reserve WLAN and to selectively authenticate electronic device 110-1. Notably, the communication techniques may allow access point 116-1 to selectively authenticate and provide secure access by electronic device 110-1 to a network. This capability may allow dynamic secure access to the network (such as access at one or more locations and/or at different times), even when authentication computer 130 is unavailable. Consequently, the communication techniques may improve the user experience when using electronic device 110-1, access point 116-1 and communicating via the network.

We now discuss embodiments in which the authentication is performed by access point 116-1 during the four-way handshake with electronic device 110-1. Notably, after receiving the identification response and generating the encryption key, access point 116-1 may provide, to electronic device 110-1, a first message in a four-way handshake with electronic device 110-1. This first message may include a random number associated with access point 116-1 (which is sometimes referred to as an 'ANonce'). In response, electronic device 110-1 may construct, derive or generate a pairwise transient key (PTK). For example, the PTK may be constructed or generated using a cryptographic calculation (such as a pseudo-random function) and optionally a pre-shared key (such as a passphrase, e.g., a dynamic pre-shared key or DPSK or another type of digital certificate), the ANonce, a second random number associated with electronic device 110-1 (which is sometimes referred to as an 'SNonce'), an identifier of access point 116-1 (such as a media access control or MAC address of access point 116-1), and/or an identifier of electronic device 110-1 (such as a MAC address of electronic device 110-1). Note that the passphrase may be preinstalled or preconfigured on electronic device 110-1 and may be stored in memory that is accessible by access point 116-1. In some embodiments, a user of electronic device 110-1 may receive the passphrase and install it on electronic device 110-1 using a portal (such as website or web page), an email, an SMS message, etc.

Note that the passphrase may be independent of an identifier associated with electronic device 110-1, such as the MAC address of electronic device 110-1. More generally, the passphrase may be independent of electronic device 110-1 or hardware in electronic device 110-1. The passphrase may be associated with a location, such as a room, a building, a communication port (such as a particular Ethernet port), etc. (In general, in the present discussion a 'location' may not be restricted to a physical location, but may be abstracted to include an object or entity associated with a physical location, such as a particular room or building.) Alternatively or additionally, the passphrase may be associated with one or more users, such as a guest or family in a hotel. Thus, in some embodiments, the passphrase includes a common passphrase that is shared by a group of electronic devices (e.g., the common passphrase may be a group DPSK).

Furthermore, electronic device 110-1 may provide a second message in the four-way handshake to access point 116-1. The second message may include the SNonce and a message integrity check (MIC) to access point 116-1. In some embodiments, the second message includes: the inputs to the cryptographic calculation and an output of the cryptographic calculation.

Additionally, instead of providing an access request to authentication computer 130, access point 116-1 may perform authentication and authorization of electronic device 110-1, including comparing cryptographic information specified by passphrase parameters (which may be included in the authentication parameters) with stored information in or associated with access point 116-1 (such as the DPSK or the other type of digital certificate) for electronic device 110-1. More generally, access point 116-1 may use information specified by the passphrase parameters to determine whether electronic device 110-1 is authorized to access networks 120 and/or 122. Note that the passphrase parameters may include: the inputs to the cryptographic calculation and an output of the cryptographic calculation. For example, the passphrase parameters may include: the ANonce, the SNonce, the MIC, the MAC address of electronic device 110-1, and/or the MAC address of access point 116-1. In addition, the passphrase parameters may include other information, such as: a cluster name, a zone name, an SSID of the reserve WLAN, a basic service set identifier (BSSID) of access point 116-1, and a username of the user.

Notably, access point 116-1 may perform brute-force calculations of outputs of the cryptographic calculation based at least in part on the inputs to the cryptographic calculation and different stored passphrases. When there is a match between one of these calculated outputs and the output received from electronic device 110-1, it may confirm that access point 116-1 is able to construct, derive or generate the same PTK as electronic device 110-1, so that electronic device 110-1 and access point 116-1 will be able to encrypt and decrypt their communication with each other. (Alternatively, instead of performing the brute-force calculations, authentication computer 130 may provide the output of the cryptographic calculation to access point 116-1, so access point 116-1 can directly confirm that there is match with the output received from electronic device 110-1.)

Then, access point 116-1 may optionally access a policy associated with the user (which may be included in the authentication parameters and/or by performing a look up based at least in part on an identifier of the user, such as a username of the user) that governs the access to the reserve WLAN (and, more generally, to networks 120 and/or 122). For example, the policy may include the policy may include a time interval when the passphrase is valid. Moreover, the policy may include a location where the passphrase is valid (such as a location of access point 116-1) or the network that the user is allowed to access. In some embodiments, access point 116-1 may communicate with a property management (PM) server (not shown), which is associated with an organization, to determine whether electronic device 110-1 is associated with the location (such as whether a user of electronic device 110-1 is checked into or associated with a room where access point 116-1 is located). Note that the location may include: a room, a building, a communication port, a facility associated with the organization (such as a hotel or an education institution), etc. More generally, access point 116-1 may optionally communicate with the PM server to determine whether one or more criteria associated with the policy are met.

Then, when there is match of the outputs of the cryptographic calculation and/or one or more criteria associated with the policy are met, access point 116-1 may selectively provide access acceptance information in a third message in the four-way handshake to electronic device 110-1. This third message may include information for establishing secure access of electronic device 110-1. For example, the access acceptance information may include: an identifier of electronic device 110-1, a tunnel type, a tunnel medium type, a tunnel privilege group identifier, a filter identifier, and the username.

Furthermore, electronic device 110-1 may provide a fourth message in the four-way handshake to access point 116-1, such as an acknowledgment. At this point, access point 116-1 may establish secure access to the reserve WLAN for electronic device 110-1 (and, more generally, secure access to networks 120 and/or 122, such as an intranet or the Internet). Notably, the secure access may be in a personal area network (PAN) in the WLAN, which is independent of traffic associated with other PANs in the WLAN.

In some embodiments, the secure access may be implemented using a virtual network associated with the location (such as a virtual network for the PAN), and the information in the access acceptance information may allow electronic device 110-1 to establish secure communication with the virtual network. This secure communication may be independent of traffic associated with other users of the reserve WLAN. For example, access point 116-1 may bridge traffic between electronic device 110-1 and another member of a group of electronic devices (such as electronic device 110-2) in the virtual network in the reserve WLAN, where the traffic in the virtual network is independent of other traffic associated with one or more different virtual networks in the network. Note that the virtual network may include a VLAN. Alternatively, when the aforementioned operations of access point 116-1 are performed by switch 128, the virtual network may include a VXLAN. In these embodiments, switch 128 may bridge wired traffic (such as Ethernet frames) associated with electronic device 110-1 in virtual network.

Moreover, the virtual network may be specified by an identifier that is included in the access acceptance information. For example, the identifier may include a VLANID (for use with access point 116-1) or a VNI (for use with switch 128). Moreover, the identifier may include information that is capable of specifying more than 4,096 virtual networks. In some embodiments, the identifier may include 24 bits, which can be used to specify up to 16 million virtual networks.

In some embodiments, the virtual network is implemented in a virtual dataplane in access point 116-1 (such as using a generic routing encapsulation or GRE tunnel). Note that a dataplane is generally responsible for moving data around transmit paths, while a control plane is generally responsible for determining and setting up those transmit paths. The dataplane may be implemented using virtual machines that are executed by multiple cores in one or more processors (which is sometimes referred to as a 'virtual dataplane'), which allows the dataplane to be flexibly scaled and dynamically reconfigured. In the present discussion, a virtual machine is an operating system or application environment that is implemented using software that imitates or emulates dedicated hardware or particular functionality of the dedicated hardware.

Additionally, in some embodiments, the policy allows the user to access multiple networks at different locations (such as different geographic locations, e.g., different hotels in a hotel brand or chain). In these embodiments, the inputs used to calculate the one or more second outputs of the cryptographic calculation may include a given identifier of a given network (such as a given SSID). Moreover, one or more stored passphrases may be organized based at least in part on identifiers of different networks. In these embodiments, related stored passphrases may be grouped based at least in part on a given network that a user is asking to join, which may reduce the computational time need by access point 116-1 to calculate the outputs for the different stored passphrases.

While the preceding discussion illustrated the communication techniques with communication between access point 116-1 (and, more generally, a computer network device) and electronic device 110-1, in other embodiments this communication may be mediated by one or more other components and/or may involve communication with the one or more other components.

Figure 2:
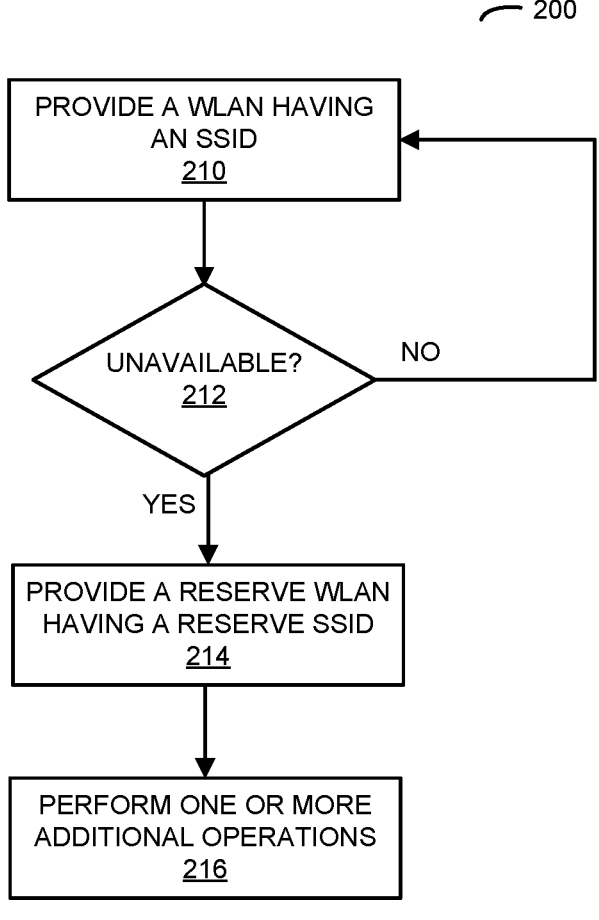
FIG. 2 is a flow diagram illustrating an example of a method for dynamically providing a reserve wireless local area network (WLAN) having a reserve service set identifier (SSID) using an electronic device in FIG. 1 in accordance with an embodiment of the present disclosure.

We now describe embodiments of the method. FIG. 2 presents a flow diagram illustrating an example of a method 200 for dynamically providing a reserve WLAN having a reserve SSID, which may be performed by an electronic device, such as one of access points 116 or one of radio nodes 118 in FIG. 1. During operation, the electronic device may provide a WLAN having an SSID (operation 210), where access to services in a network via the WLAN is gated by authentication performed by the computer. When the computer is offline or communication with the computer is unavailable (operation 212), the electronic device may dynamically provide the reserve WLAN having the reserve SSID (operation 214), where access to a subset of the services in the network via the reserve WLAN is gated by second authentication performed by the electronic device.

Note that the electronic device may include an access point. Moreover, the computer may include a controller of the electronic device or an authentication computer. For example, the authentication computer may include a RADIUS server or a AAA server.

Furthermore, the services may include sensitive (or more-secure) and insensitive (or less-secure) services, and the subset of the services may include the insensitive services.

Additionally, the second authentication may be less secure than the authentication. For example, the second authentication may include PSK authentication.

In some embodiments, the electronic device may optionally perform one or more additional operations (operation 216). For example, when the computer is online or communication with the computer is available, the electronic device dynamically turns off the reserve WLAN having the reserve SSID. Alternatively or additionally, when no electronic devices are connected to the reserve WLAN having the reserve SSID (such as because the connections time out or user-initiated disconnection from the one or more second electronic devices), the electronic device dynamically turns off the reserve WLAN having the reserve SSID.

Note that when the computer is online and when the electronic devices are still associated with the reserve WLAN, one or more additional electronic devices joining the network at this time may not be allowed to use the reserve WLAN. Instead, the one or more additional electronic devices may only be allowed to join via the WLAN.

In some embodiments of method 200, there may be additional or fewer operations. Furthermore, the order of the operations may be changed, and/or two or more operations may be combined into a single operation.

Figure 3:
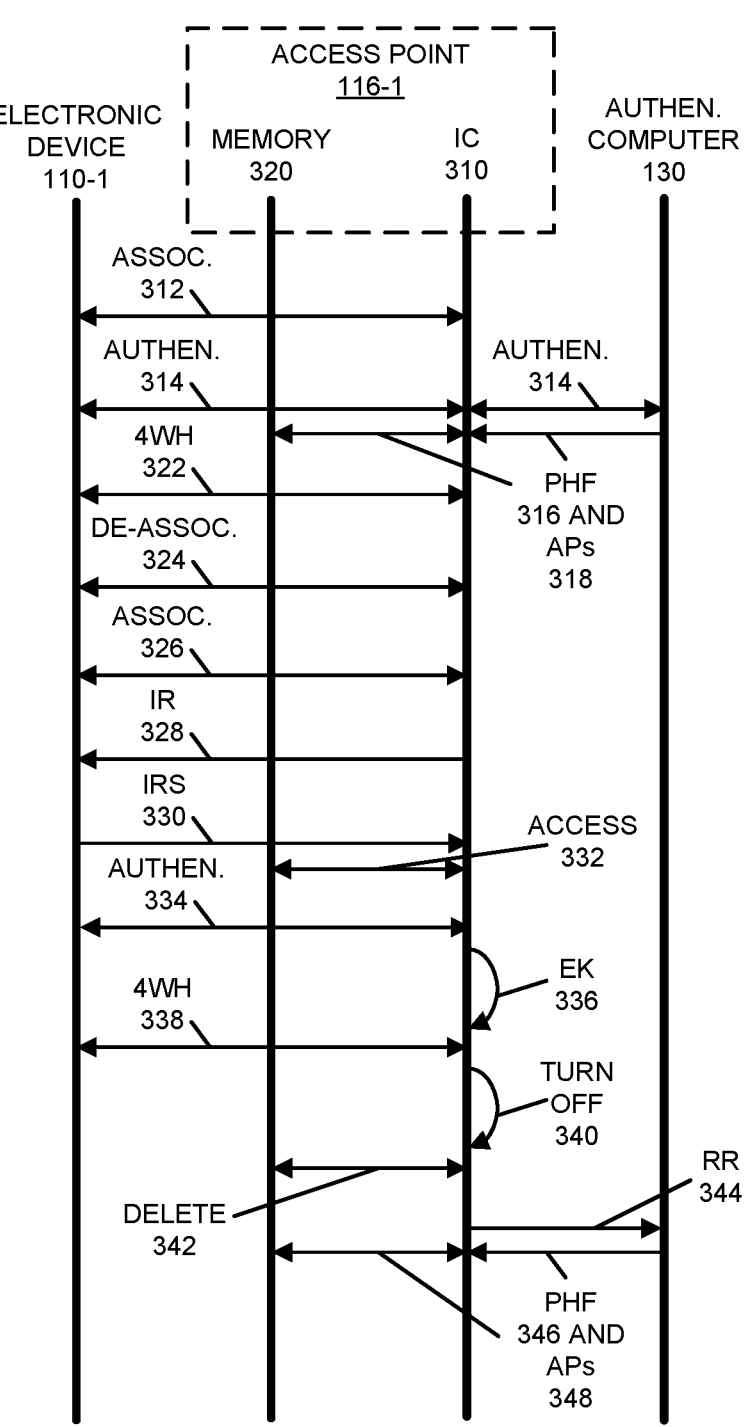
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication among electronic device 110-1, access point 116-1, and authentication computer 130. In FIG. 3, electronic device 110-1 may discover and associate 312 with access point 116-1 via an interface circuit (IC) 310 in access point 116-1. For example, electronic device 110-1 may discover a WLAN having an SSID that is provided by access point 116-1, and may associate 312 with the WLAN via interface circuit 310.

Moreover, electronic device 110-1 may authenticate 314 with authentication computer 130 via communication with interface circuit 310. After authentication 314, electronic device 110-1 may be able to access services in a network, include sensitive and insensitive services.

Furthermore, after authentication 314, authentication computer 130 may provide to interface circuit 310 a predefined hash function or PHF (such as a key hash) 316 and associated authentication parameters (APs) 318, which are associated with an authentication technique (such as a type of EAP). After receiving the predefined hash function 316 and the authentication parameters 318, interface circuit 310 may store the predefined hash function 316 and the authentication parameters 318 in memory 320 in access point 116-1. Then, interface circuit 310 may perform a four-way handshake (4WH) 322 with electronic device 110-1.

Subsequently, electronic device 110-1 may de-associate 324 from access point 116-1. Furthermore, when authentication computer 130 is offline or communication with authentication computer 130 is unavailable, access point 116-1 may dynamically provide a reserve WLAN having a reserve SSID. Electronic device 110-1 may discover 326 the reserve WLAN having the reserve SSID that is provided by access point 116-1, and may associate 326 with the reserve WLAN via interface circuit 310 via interface circuit 310. When this occurs, interface circuit 310 may provide an identity request (IR) 328 to electronic device 110-1. After receiving identity request 328, electronic device 110-1 may provide an identity response (IRS) 330 to access point 110-1, e.g., with a password of a user of electronic device 110-1. This identity response may be received by interface circuit 310.

Then, access point 116-1 may authenticate electronic device 110-1. Notably, interface circuit 310 may access 332 predefined hash function 316 and the authentication parameters 318 in memory 320. Additionally, interface circuit 310 may perform authentication 334 with electronic device 110-1 based at least in part on the predefined hash function 316, where the authentication is compatible with the authentication technique.

Moreover, interface circuit 310 may generate an encryption key (EK) 336, and may establish secure communication with electronic device 110-1 by performing a four-way handshake (4WH) 338 with electronic device 110-1 based at least in part on the encryption key 336.

Furthermore, when authentication computer 130 is online or communication with authentication computer is available, access point 116-1 may turn off 340 the reserve WLAN.

In some embodiments, the authentication parameters 318 may specify a time interval or a timeout for the predefined hash function 316. After the time interval has elapsed, interface circuit 310 may optionally delete 342 the predefined hash function 316. Alternatively, when authentication computer 130 is online or communication with authentication computer is available, interface circuit 310 may provide, to authentication computer 130, a renewal request (RR) 344 prior to the time interval elapsing. In response, authentication computer 130 may provide to interface circuit 310 a second predefined hash function 346 and second authentication parameters 348, which are associated with the authentication technique. After receiving the second predefined hash function 346 and the second authentication parameters 348, interface circuit 310 may store the second predefined hash function 346 and the second authentication parameters 348 in memory 320.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. The communication techniques may enable the continuation of WLAN services (without and/or with restricted access) even when an access point loses connectivity with a controller/AAA server. In deployments, users may need to be authenticated/authorized via the controller/AAA server to get access to all the required services, which may include sensitive and insensitive services. Communication issues between the access point and the controller/AAA server may result in authentication failures, which may lead access points to reject access to the required services. In the communication techniques, a reserve WLAN having a reserve SSID may be dynamically launched to allow access to insensitive services (such as to obtain an employee identifier and name, as opposed to more-detailed employment records, e.g., Social Security numbers, tax information, etc.). The sensitive services that require authentication and authorization via the controller/AAA server may still be restricted. The reserve SSID may be turned off when access point connectivity with Controller/AAA server is restored or when associated conditions are met.

In a typical enterprise scenario, a user may be authenticated and authorized via the controller/AAA server. Because access to sensitive services may require stronger authentication (e.g., using role-based authorized access) by the controller/AAA server. After authentication, user equipment can access all the allowed services, which may include sensitive and insensitive services.

When the controller/AAA server becomes unreachable and user equipment cannot get authenticated, access may be denied, which may include sensitive and insensitive services. In embodiments where user equipment does not require access to sensitive services, then the stronger authentication and authorization may not be required for accessing insensitive services. In order to provide access to insensitive service, the communication techniques may facilitate localized authentication.

Notably, an access point may dynamically bring up a reserved WLAN having a reserve SSID when the controller/AAA server becomes unresponsive. This reserve WLAN may use PSK authentication for restricted access to insensitive services where the controller/AAA server authentication is not required. User equipment joining the network can use the reserved WLAN to get limited access. There may not be access to sensitive services via the reserve WLAN. Instead, the sensitive services may need the strong authentication provided by the controller/AAA server.

The reserve SSID may be turned off when: access point-controller/AAA server communication is restored; and/or all existing user equipment connected via the reserve WLAN are disconnected, e.g., because of a user-initiated disconnection or a time out based at least in part on expiration of a session/idle timer. Additional user equipment may not be allowed to connect with the reserve WLAN after the access point-controller/AAA server connection is restored. For example, the access point may suppress probe responses and responses to association requests for the reserve WLAN. Instead, user equipment may use the WLAN having the SSID to get authenticated by the controller/AAA server to access to sensitive and insensitive services.

While the preceding discussion illustrated the communication techniques with a variety of authentication techniques, in other embodiments the communication techniques may be extended for use with additional authentication techniques. For example, the communication techniques may be extended to be compatible with some types of EAP techniques (such as EAP-TTLS-Challenge Handshake Authentication Protocol or CHAP and EAP-generalized Pre-Shared Key or GPSK) that exchange parameters with the client to generate its hash key. Alternatively, the communication techniques may be extended to be compatible with other types of EAP techniques (such as EAP-TTLS-Password Authentication Protocol or PAP and EAP-Generic Token Card or GTC) that verify a password without a hash derivation. In these embodiments, the authentication computer may provide the necessary information to the access point needed to support any of these authentication techniques, thereby selectively allowing access point 116-1 to perform the authentication when needed.

We now describe embodiments of an electronic device, which may perform at least some of the operations in the communication techniques. FIG. 4 presents a block diagram illustrating an example of an electronic device 400 in accordance with some embodiments, such as one of: base station 108, one of electronic devices 110, computer 112, one of access points 116, one of radio nodes 118, switch 128, or authentication computer 130. This electronic device includes processing subsystem 410, memory subsystem 412, and networking subsystem 414. Processing subsystem 410 includes one or more devices configured to perform computational operations. For example, processing subsystem 410 can include one or more microprocessors, graphics processing units (GPUs), ASICs, microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include DRAM, static random access memory (SRAM), and/or other types of memory. In some embodiments, instructions for processing subsystem 410 in memory subsystem 412 include: one or more program modules or sets of instructions (such as program instructions 422 or operating system 424, such as Linux, UNIX, Windows Server, or another customized and proprietary operating system), which may be executed by processing subsystem 410. Note that the one or more computer programs, program modules or instructions may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as antenna nodes 408, e.g., a metal pad or a connector, which can be coupled to the one or more antennas 420, or nodes 406, which can be coupled to a wired or optical connection or link. Thus, electronic device 400 may or may not include the one or more antennas 420. Note that the one or more nodes 406 and/or antenna nodes 408 may constitute input(s) to and/or output(s) from electronic device 400.) For example, networking subsystem 414 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 400 may be adapted or changed using pattern shapers (such as directors or reflectors) and/or one or more antennas 420 (or antenna elements), which can be independently and selectively electrically coupled to ground to steer the transmit antenna pattern in different directions. Thus, if one or more antennas 420 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 400 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Moreover, electronic device 400 may include a user-interface subsystem 430, such as: a mouse, a keyboard, a trackpad, a stylus, a voice-recognition interface, and/or another human-machine interface. In some embodiments, user-interface subsystem 430 may include or may interact with a touch-sensitive display in display subsystem 426.

Electronic device 400 can be (or can be included in) any electronic device with at least one network interface. For example, electronic device 400 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments instructions 422 is included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414 and/or of electronic device 400. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 422, operating system 424 (such as a driver for interface circuit 418) or in firmware in interface circuit 418. Alternatively or additionally, at least some of the operations in the communication techniques may be implemented in a physical layer, such as hardware in interface circuit 418.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more interface circuits configured to communicate with a computer;
   a processor coupled to the one or more interface circuits; and
   memory, coupled to the processor, configured to store program instructions, wherein, when executed by the processor, the program instructions cause the electronic device to perform operations comprising:
      providing a wireless local area network (WLAN) having a service set identifier (SSID), wherein access to services in a network via the WLAN is gated by authentication performed by the computer; and
      when the computer is offline or communication with the computer is unavailable, dynamically providing a reserve WLAN having a reserve SSID, wherein access to a subset of services in the network via the reserve WLAN is gated by a second authentication performed by the electronic device,
   wherein, when no electronic devices are connected to the reserve WLAN having the reserve SSID, dynamically turning off the reserve WLAN having the reserve SSID.

2. The electronic device of claim 1, wherein the electronic device comprises an access point.

3. The electronic device of claim 1, wherein the computer comprises a controller of the electronic device or an authentication computer.

4. The electronic device of claim 3, wherein the authentication computer comprises a RADIUS server or an authentication, authorization, and accounting (AAA) server.

5. The electronic device of claim 1, wherein the services comprise sensitive or more-secure and insensitive or less-secure services, and the subset of the services comprises the insensitive or less-secure services.

6. The electronic device of claim 1, wherein the second authentication is less secure than the authentication.

7. The electronic device of claim 6, wherein the second authentication comprises pre-shared-key (PSK) authentication.

8. The electronic device of claim 1, wherein the operations comprise, when the computer is online or communication with the computer is available, dynamically turning off the reserve WLAN having the reserve SSID.

9. The electronic device of claim 1, wherein the operations comprise, when the computer is online or communication with the computer is available and at least a second electronic device is connected to the reserve WLAN having the reserve SSID, only allowing an additional electronic device to connect to the WLAN having the SSID.

10. A method for dynamically providing a reserve wireless local area network (WLAN) having a reserve service set identifier (SSID), the method comprising:
   sending a first WLAN identifier associated with a first SSID for authentication by an authentication server to authorize access to a first set of network resources;
   monitoring reachability of the authentication server;
   in response to determining that the authentication server is unreachable, sending a second WLAN identifier associated with a reserve SSID while continuing to send the first WLAN identifier associated with the first SSID;
   receiving, via the reserve SSID, an association request from a client device;
   locally authenticating the client device at an access point, independent of the authentication server; and
   responsive to successfully locally authenticating the client device, assigning the client device a restricted network access policy that permits access to a second set of network resources that is a subset of the first set of network resources.

11. The method of claim 10, wherein monitoring reachability of the authentication server comprises determining that the authentication server is unreachable based on an absence of a received heartbeat message from the authentication server during a time interval.

12. The method of claim 10, wherein locally authenticating the client device comprises performing pre-shared-key (PSK) authentication based on a credential stored at the access point.

13. The method of claim 10, wherein assigning the restricted network access policy comprises at least one of assigning a restricted virtual local area network (VLAN), applying a filter identifier, or applying a role-based access policy that blocks access to one or more sensitive services while permitting access to one or more insensitive services.

14. The method of claim 10, further comprising:
   after determining that the authentication server is reachable, suppressing acceptance of new client associations via the reserve SSID while maintaining the restricted network access policy for client devices currently associated via the reserve SSID.

15. The method of claim 14, further comprising:
   turning off the reserve WLAN by terminating broadcast of the reserve SSID in response to determining that no client devices are associated via the reserve SSID.

16. A method for dynamically providing a reserve wireless local area network (WLAN) having a reserve service set identifier (SSID), comprising:
   providing, by an electronic device, a WLAN having an SSID, wherein access to services in a network via the WLAN is gated by authentication performed by a computer; and
   when the computer is offline or communication with the computer is unavailable, dynamically providing the reserve WLAN having the reserve SSID, wherein access to a subset of the services in the network via the reserve WLAN is gated by a second authentication performed by the electronic device; and when the computer is online or communication with the computer is available, dynamically turning off the reserve WLAN having the reserve SSID.

17. The method of claim 16, wherein the computer comprises a controller of the electronic device or an authentication computer.

18. The method of claim 16, wherein the services comprise sensitive or more-secure and insensitive or less-secure services, and the subset of the services comprises the insensitive or less-secure services.

19. The method of claim 16, wherein the second authentication is less secure than the authentication.

20. The method of claim 16, wherein the electronic device comprises an access point.

\* \* \* \* \*